No. 12,455. REISSUED FEB. 20, 1906.

K. KIEFER.

FILTER PULP PACKING MACHINE.

APPLICATION FILED NOV. 20, 1905.

5 SHEETS—SHEET 1.

Witnesses.

C. J. Appleton

J. W. Wroden

Inventor.

Karl Kiefer

No. 12,455.

REISSUED FEB. 20, 1906.

K. KIEFER.

FILTER PULP PACKING MACHINE.

APPLICATION FILED NOV. 20, 1905.

5 SHEETS—SHEET 2.

Witnesses.
E. J. Appleton
F. W. Wrodn

Inventor.
Karl Kiefer

No. 12,455. REISSUED FEB. 20, 1906.

K. KIEFER.

FILTER PULP PACKING MACHINE.

APPLICATION FILED NOV. 20, 1905.

5 SHEETS—SHEET 3.

Witnesses.

E. J. Appleton

J. W. Wroorn

Inventor.

Karl Kiefer

No. 12,455. REISSUED FEB. 20, 1906.

K. KIEFER.

FILTER PULP PACKING MACHINE.

APPLICATION FILED NOV. 20, 1905.

5 SHEETS—SHEET 4.

Witnesses.
E. J. Appleton
G. W. Wrodrn

Inventor.
Karl Kiefer

No. 12,455. REISSUED FEB. 20, 1906.

K. KIEFER.

FILTER PULP PACKING MACHINE.

APPLICATION FILED NOV. 20, 1905.

5 SHEETS—SHEET 5.

*Witnesses.*
E. J. Appleton
E. W. Wrodn

*Inventor.*
Karl Kiefer

UNITED STATES PATENT OFFICE.

KARL KIEFER, OF CINCINNATI, OHIO.

FILTER-PULP-PACKING MACHINE.

No. 12,455. Specification of Reissued Letters Patent. Reissued Feb. 20, 1906

Original No. 797,122, dated August 15, 1905. Application for reissue filed November 20, 1905. Serial No. 288,335.

*To all whom it may concern:*

Be it known that I, KARL KIEFER, a citizen of the United States, and a resident of Cincinnati, in the county of Hamilton and State of Ohio, have invented a new and useful Improvement in Filter-Pulp-Packing Machines, of which the following is a specification.

My improvement relates to improvements in filter-pulp-packing machines for the production of filter layers of semimoist compressed pulp for beer and wine filters—for instance, such as patented to me January 10, 1905, No. 779,607.

The object of this invention is to simplify and cheapen the construction of such packing-machines and to facilitate the packing of the filter layers, to produce a perfect interlacing between the neighboring filter layers, and to produce filter layers of non-homogeneous consistency—that is, in places wherever wanted, they are produced more compressed than at other places.

Figure 1:
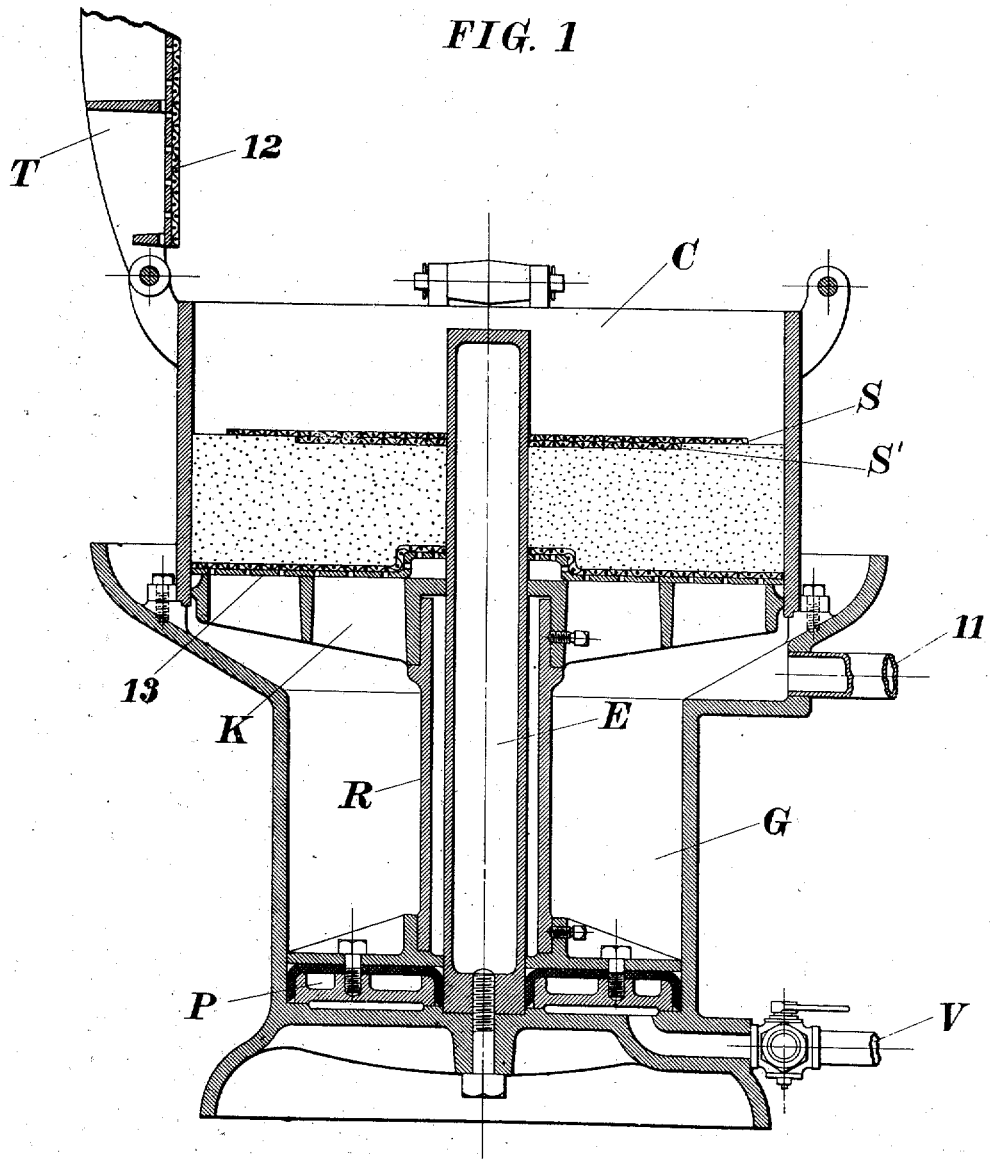
Figure 2:
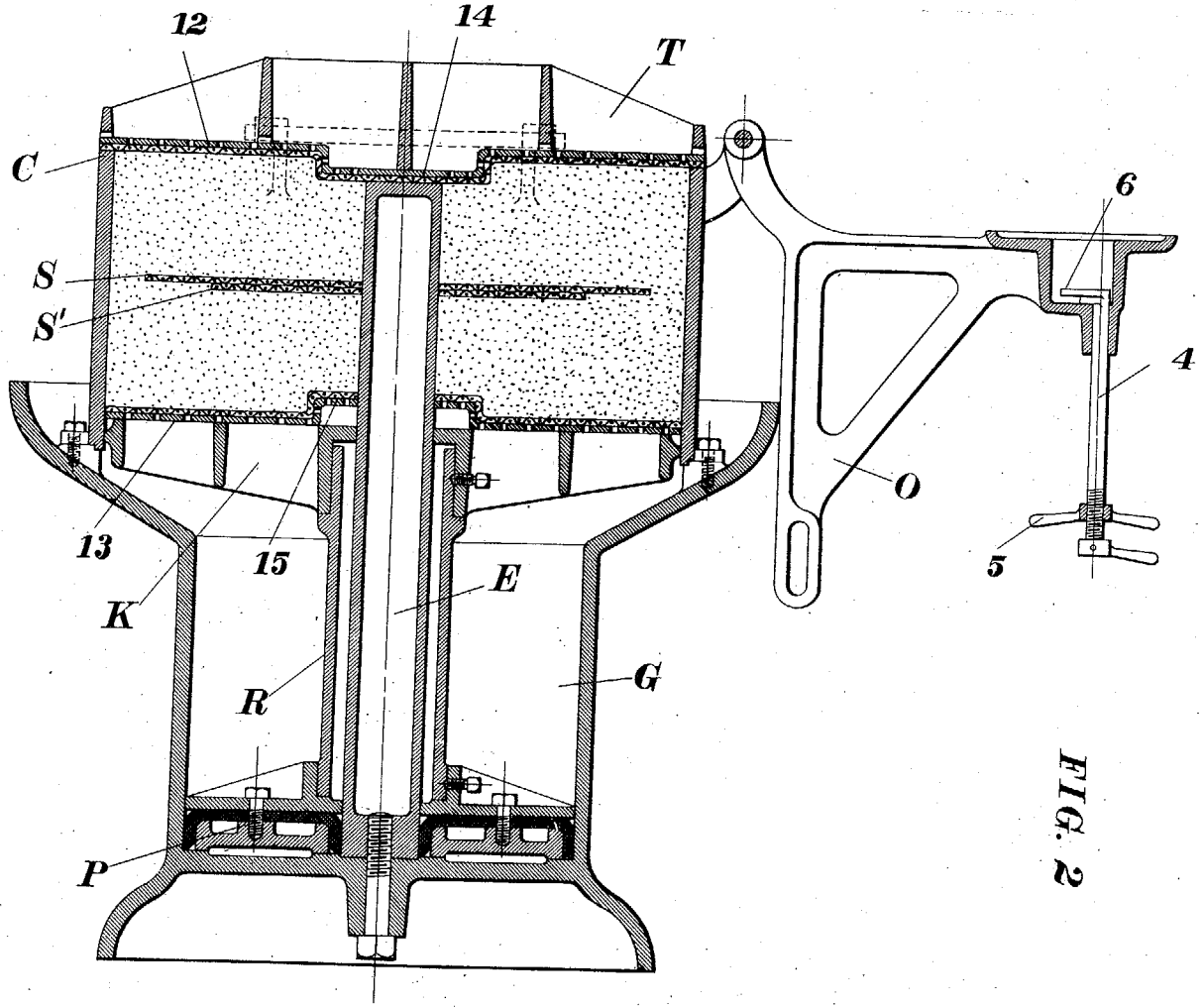
Figure 3:
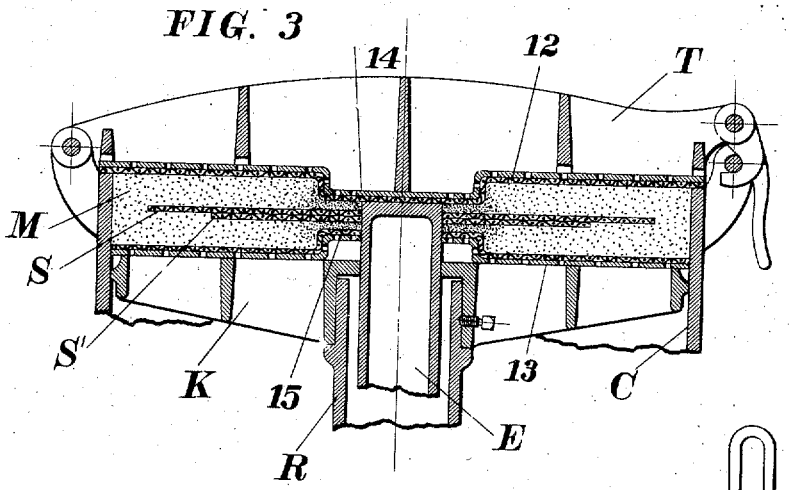
Figure 4:
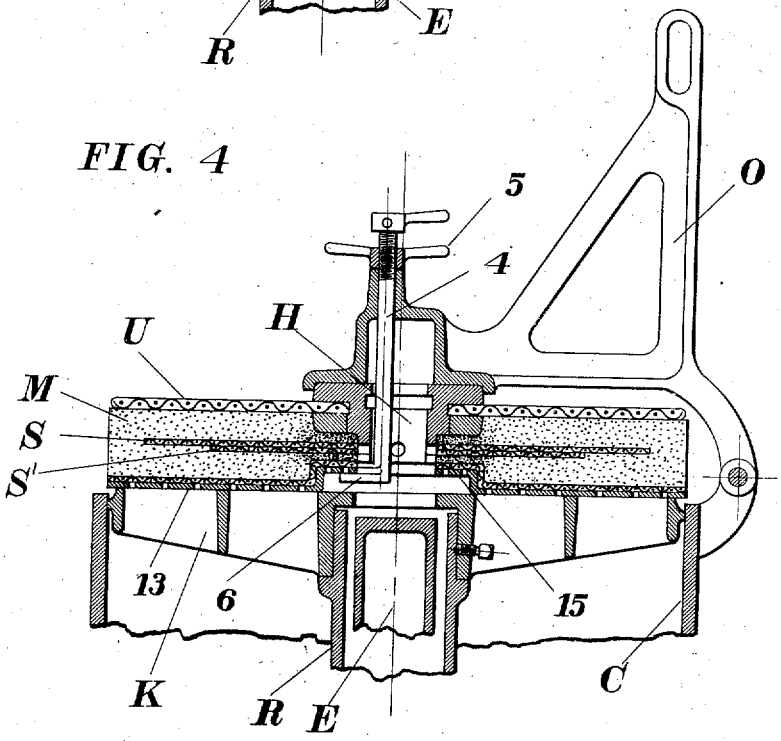
Figure 5:
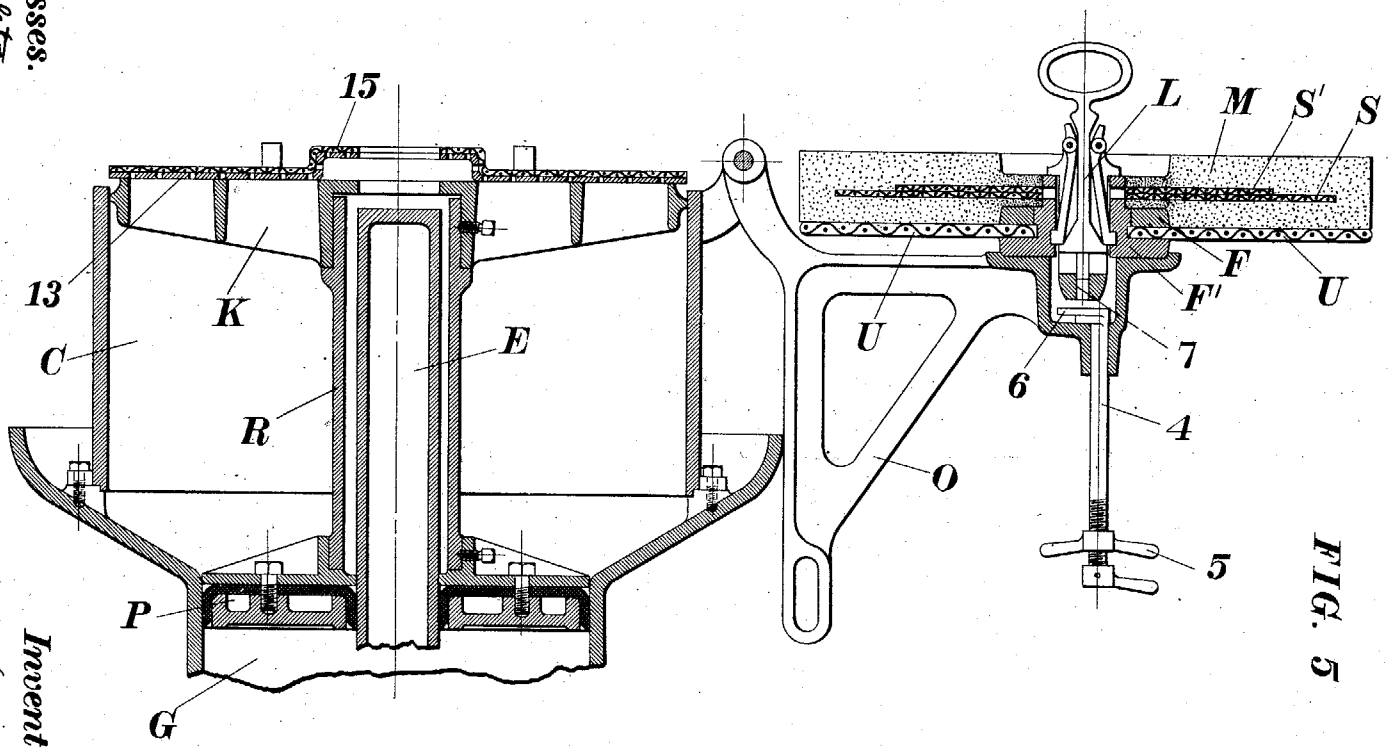
Figure 6:
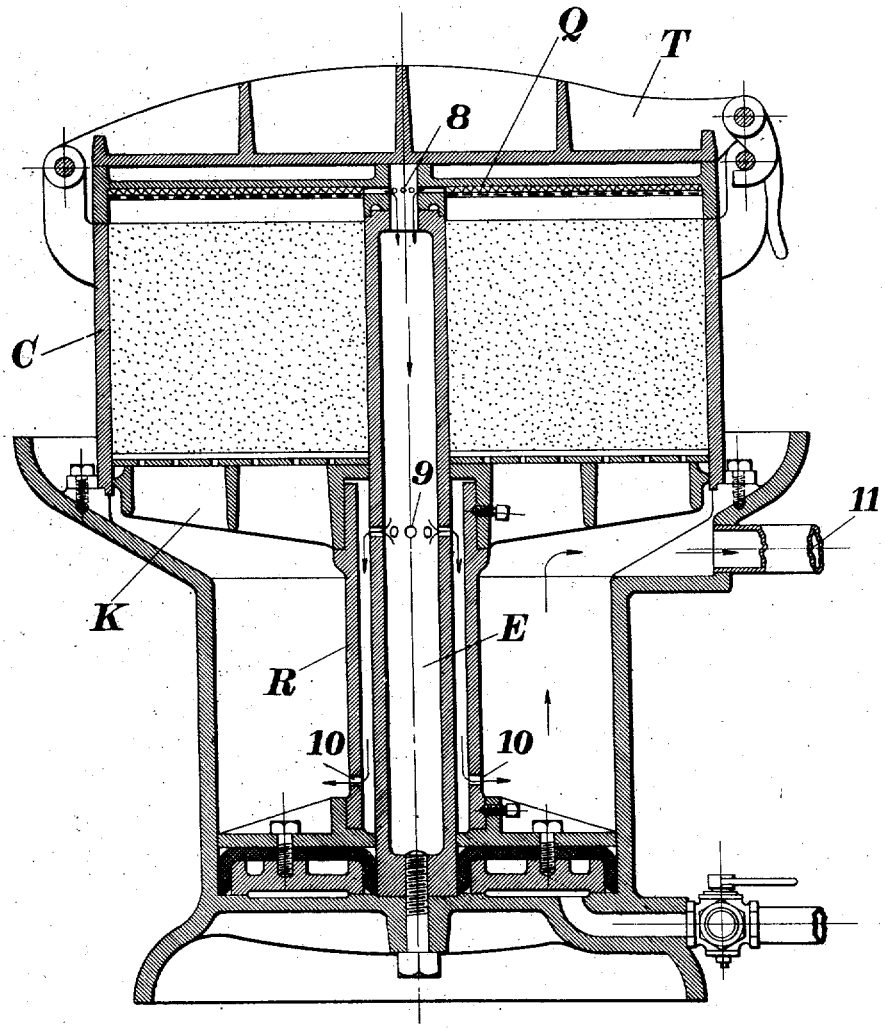

Figure 1 shows a cross-section of this machine with the lid open and half the filter mass and a "liquid-conductor" placed therein. Fig. 2 shows the packing-machine closed with all the filter mass and liquid-conductor in it. Fig. 3 shows the top of the machine, showing the last stage of compression. Fig. 4 shows the newly-formed filter element raised above the packing-machine ready for reversing. Fig. 5 shows the filter element reversed by means of the mechanism attached ready to be taken from the packing-machine. Fig. 6 is a modification of the packing-machine adapted to pack a different style of liquid-conductor.

"Liquid-conductor" I will call the device necessary in a filter to form the immediate conduits for the liquid for supplying or draining disk-shaped filter layers. As a rule they are flat metal constructions of perforated plates and gauze, or, as patented to me in my above-mentioned patent, of woven-wire screens only. In this present application the outlet liquid-conductor, as shown in Fig. 3, is composed of two fiber-retaining copper screens S and S′, each one only about one-sixteenth of an inch thick. One may be a little smaller in diameter than the other, or they may be of like size, or only one screen may be used. The inlet liquid-conductor may consist of a single coarse-wire screen U, such as shown in Figs. 4 and 5, also patented to me and described in the above-mentioned patent.

The packing-machine proper consists of an exterior stationary cylinder C, a hydraulic cylinder G, that forms the framework for the machine at the same time, and hydraulic piston P, carrying, by means of the hollow column R, a press-plate K. Press-plate K moves with a nice fit within the cylinder C. The tube E is fastened to the base of the hydraulic cylinder G, and the hydraulic piston P is tightened against the interior cylinder E and the exterior cylinder G by means of cup-leathers. A three-way cock K supplies the press-water or air and serves also as the outlet.

T is a hinged cover carrying the perforated plate 12, covered with wire-gauze. The press-plate K also carries loose a similar perforated plate 13, covered with wire-gauze. Both perforated plates 12 and 13 have centrally-raised and ring-shaped parts 14 and 15, also perforated and for a purpose later on described.

The filter element to be produced by the packing-machine illustrated is shown in its method of manufacture in Figs. 1 to 4, and in its completion in cross-section, Fig. 5, (right-hand side.) As seen in Fig. 5, it consists of two filter layers of compressed pulp interlaced at the periphery and embedding a fine-wire screen S, as an outlet liquid-conductor and a strong metal compression body F F′, rigidly connected to which is a coarse-wire screen U, constituting the inlet liquid-conductor.

To produce the filter element, half of the filter mass is dumped into the machine in diluted condition, Fig. 1, and the light liquid-conductor, consisting of screens S and S′, is thrown over the interior cylinder E. For this purpose S and S′ have a central hole, so that they fit snugly around the cylinder E. Then the remaining half of the filter mass is thrown over it properly distributed, if necessary, and the cover closed, as shown in Fig. 2. Thereupon the press-water is turned on at V and the paper mass compressed to a stage shown in Fig. 3. If the perforated plate 13 and also the perforated plate attached to the cover 12 have central and ring-shaped projections 14 and 15, as shown in Figs. 3, 4, and 5, the filter mass will be more compressed at the center than at any other part, as shown by the increased number of dots. In fact, it may by these projections be compressed to perfect dryness and imporosity. I will explain the reason why this is the case. It is made possible in one operation by the fibrous nature of the filter-pulp and facilitated by pressing the water out in two opposite directions only—namely, top and bottom. If the filter-pulp would be an absolutely plastic material, the result would be a perfect homogeneous pulp layer. Now the plasticity of the pulp disappears with the loss of its moisture, and while it is still compressible up to dryness it is not perfectly plastic or ductile in all directions. In the position shown in Figs. 3, 4, and 5 the fibers around the center cannot escape from their place during pressure, as would be the case with a perfectly ductile material; but by reason of the interlacing of the fibers they have to remain at their places. By expressing the water in two opposite directions only—namely, top and bottom—I keep the fibers in a relative position of rest within the pulp layer horizontally, and a perfect non-homogeneous filter layer is the result, while if I were to extract the water from the sides of the cylinder the fiber would move in radial directions, following the flow of the water, and the result would be an imperfect layer. While at each place of the filter layer the same amount of fibers is compressed, the ratio of compression in the filter layer may vary from one to two to one to four up to imperviousness. The filter element proper, consisting now only of the light and pliable liquid-conductors S and S′ and the mass M, would be difficult to remove with its surrounding filter mass without breaking or disintegrating the newly-compressed mass. In order to transport it, I therefore raise it above the level of the exterior cylinder C until I can catch, by means of the hand, the plate 13, whereupon it can be carried away upon plate 13, or, if other liquid-conductors of the kind as shown in Fig. 4, consisting of strong wire-cloth and a central hub, are used I may put same on top, as shown in Fig. 4, and reverse the whole filter element, clutching, by means of the clutch arrangement 4, 5, and 6, the press-plate 13 and reversing it by means of the lever O into the position as shown in Fig. 5.

The clutch arrangement consists of a strong pin 4, lock-nuts 5, and an eccentric-finger 6. The working is easily visible from the detailed drawings. After the element is reversed, as shown in Fig. 5, the perforated plate 13 is put in its place again and the filter element may be removed by the lifting-tool L. (Shown in Fig. 5.)

Fig. 6 shows a modification of the press arranged for packing pan filter layers, such as patented to me in my Patent No. 579,586, March 30, 1897, or similar. The press is arranged in such a manner that the filter-pan is interposed between the stationary cylinder C, interior cylinder E, and the hinged cover T. All the mass necessary for the element is thrown into the packing-machine same as before, whereupon the filter-pan Q, in an inverted position, is placed on top and centered by the tube that enters into central projections of the filter element Q. The cover T thereupon is closed and the hydraulic-press arrangement operated. The mass is pressed against the filter elements from underneath, adhering well enough thereon so it can be removed and reversed by means of plate 13. The press-water escapes through the central opening 8 at the top of the tube E, as indicated by the arrows, from there through the holes 9 farther below, from there through the holes 10 of the piston-column, and then through the opening 11 in the frame-casting. It is not necessary when using such plates that the swing-cover should be porous. As indicated, it may be solid; but it may also consist of an open frame.

What I claim as my invention, and desire to secure by Letters Patent, is—

1. In a filter-pulp-packing machine, the combination of an exterior stationary cylinder, of a stationary central cylinder, a porous bottom moving longitudinally and snugly fitting into the ring-shaped space between the two cylinders, and a removable cover.

2. In a filter-pulp-packing machine, the combination of an exterior stationary cylinder, of a stationary central cylinder, a porous bottom moving longitudinally and snugly fitting into the ring-shaped space between the two cylinders, a removable cover and a liquid-conductor between bottom and cover.

3. In a filter-pulp-packing machine, the combination of an exterior stationary cylinder, of a stationary central cylinder, a porous bottom moving longitudinally and snugly fitting into the ring-shaped space between the two cylinders, and a removable porous cover.

4. In a filter-pulp-packing machine, the combination of an exterior stationary cylinder, of a stationary central cylinder, a porous bottom moving longitudinally and snugly fitting into the ring-shaped space between the two cylinders, a removable cover and a liquid-conductor within the exterior cylinder, cover and bottom.

5. In a filter-pulp-packing machine, the combination of an exterior stationary and non-porous cylinder, a central and stationary cylinder, a framework upon which both cylinders are fastened, a hydraulic and ring-shaped piston with a central opening, carrying a filter-mass-pressing plate with a removable open-work disk, a cover removable so as to gain access to the interior of the stationary cylinder, and to insert the liquid-conductor.

6. In a filter-pulp-packing machine, the combination of an exterior cylinder, an interior cylinder much smaller in diameter, a liquid-conductor longitudinally movable on one of said cylinders and spaced apart from the other, a bottom part movable in relation to said cylinders, and a cover that can be removed to gain access into the interior of the exterior cylinder.

7. In a filter-pulp-packing machine, a filter-layer-reversing mechanism, consisting of a frame part, revoluble one hundred and eighty degrees relative to a supporting-point, a clamping mechanism adapted to take hold of the bottom press-plate of the packing-machine during the act of reversing, and release it again for the purpose of the removal of the filter layers.

8. In a filter-pulp-packing machine, the combination with a filter-layer-press mechanism proper, of a reversing mechanism having a frame part fulcrumed in a horizontal plane near the top of the machine, having a clamping arrangement adapted to take hold of the press-plate of the packing-machine, filter layer, liquid-conductor and auxiliary press-plate, and adapted to move one hundred and eighty degrees around the fulcrum of the frame.

9. In a filter-pulp-packing machine, the combination of a container, a bottom and cover to such container, at least one of them fitting snugly within the container and sliding therein, means for approaching the bottom and top part so as to express the water from the pulp, and means producing during such approach a materially stronger compression to some parts of the pulp than to others.

10. In a filter-pulp-packing machine, the combination of a container, of a plane bottom and a plane cover to such container, means of approaching both of them so as to express the liquid from the pulp within the container, of protuberances attached to the bottom and top adapted to produce a stronger compression upon the filter-pulp in contact with said protuberances than is produced upon the rest of the filter-pulp.

11. In a filter-pulp-packing machine, the combination of a container, of a plane bottom and a plane cover to such container, means of approaching both of them so as to express the liquid from the pulp within the container, of porous protuberances attached to the bottom and top, adapted to produce a stronger compression upon the filter-pulp in contact with said porous protuberances than is produced upon the rest of the filter-pulp.

12. In a filter-pulp-packing machine, the combination of an exterior cylinder, of an interior cylinder, of a bottom and top part, one of said parts snugly fitting into the ring-shaped space between the two cylinders and moving longitudinally therein, of ring-shaped protuberances attached to the moving part adapted to produce a stronger compression upon the filter mass in contact therewith than is produced upon the rest of the filter mass.

13. In a filter-pulp-packing machine, the combination of a stationary exterior cylinder, of a central stationary cylinder, a framework on which both cylinders are fastened, a porous plane bottom moving longitudinally and snugly fitting into the ring-shaped space between the two cylinders, of a removable cover, of ring-shaped protuberances adapted to produce stronger compression to the pulp and attached to the cover, of a liquid-conductor within the exterior cylinder, interior cylinder, cover and bottom.

14. In a filter-pulp-packing machine, the combination of a stationary exterior non-porous cylinder, of a central stationary interior cylinder, of a framework on which both cylinders are fastened, a porous bottom moving longitudinally and snugly fitting into the ring-shaped space between the two cylinders, of a removable cover, of ring-shaped porous protuberances between bottom and cover, of a liquid-conductor within the exterior cylinder, interior cylinder, cover and bottom.

15. In a filter-pulp-packing machine, the combination of a stationary exterior cylinder, of a central interior cylinder, of a bottom plate and a top plate, one of them fitting snugly within the ring-shaped space between the two cylinders, moving longitudinally therein, and having ring-shaped protuberances concentrically arranged, the latter adapted to more compress the filter-pulp in contact therewith than the rest of the filter-pulp.

16. A filter-layer-reversing mechanism consisting of a frame part, revolubly fulcrumed, in combination with a clamping mechanism to take hold of the filter layers between two rigid disks, whereby said filter-layers may be reversed one hundred and eighty degrees.

17. A filter-layer reversing mechanism consisting of a frame part, in combination with a clamping mechanism for compressing the filter layers between two metal plates, said frame part fulcrumed so as to be revoluble one hundred and eighty degrees.

In testimony whereof I have signed my name to this specification in the presence of two subscribing witnesses.

KARL KIEFER.

Witnesses:
E. J. APPLETON,
G. W. WERDEN.